United States Patent
Hoang et al.

(10) Patent No.: US 11,386,719 B2
(45) Date of Patent: Jul. 12, 2022

(54) ELECTRONIC DEVICE AND OPERATING METHOD THEREFOR

(71) Applicant: SAMSUNG ELECTRONICS CO., LTD., Suwon-si (KR)

(72) Inventors: Hung The Hoang, Hanoi (VN); Thuy Thi Nguyen, Bac Ninh (VN)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 0 days.

(21) Appl. No.: 17/258,333

(22) PCT Filed: Aug. 16, 2018

(86) PCT No.: PCT/KR2018/009368
§ 371 (c)(1),
(2) Date: Jan. 6, 2021

(87) PCT Pub. No.: WO2020/036238
PCT Pub. Date: Feb. 20, 2020

(65) Prior Publication Data
US 2021/0209389 A1 Jul. 8, 2021

(51) Int. Cl.
*G06V 40/60* (2022.01)
*G06V 40/19* (2022.01)
*G06V 40/18* (2022.01)

(52) U.S. Cl.
CPC .............. *G06V 40/67* (2022.01); *G06V 40/19* (2022.01); *G06V 40/193* (2022.01)

(58) Field of Classification Search
CPC .... G06V 40/197; G06V 40/172; G06V 40/70; G06V 10/993; G06V 40/165;
(Continued)

(56) References Cited

U.S. PATENT DOCUMENTS

| 7,146,027 B2 | 12/2006 | Kim et al. |
| 8,437,513 B1 * | 5/2013 | Derakhshani .......... G06V 40/18 382/115 |

(Continued)

FOREIGN PATENT DOCUMENTS

| EP | 3009960 A1 * | 4/2016 | ......... G06K 9/00617 |
| JP | 2013148961 A1 | 8/2013 | |

(Continued)

OTHER PUBLICATIONS

An Iris-Based Authentication Framework to Prevent Presentation Attacks (Year: 2017).*

(Continued)

*Primary Examiner* — Nizar N Sivji
(74) *Attorney, Agent, or Firm* — Sughrue Mion, PLLC

(57) ABSTRACT

Provided is an electronic device that performs user authentication by using iris recognition, the electronic device including a camera capturing an eye image of a user, a display, a memory storing one or more instructions, and at least one processor configured to execute the one or more instructions stored in the memory, in which the at least one processor is configured to display a guide image on the display, change an attribute of the guide image from a first state to a second state and display the guide image, obtain first iris data from a first eye image of the user corresponding to a guide image having an attribute of the first state, obtain second iris data from a second eye image of the user corresponding to a guide image having an attribute of the second state, and perform user authentication based on the first iris data and the second iris data.

20 Claims, 22 Drawing Sheets

(58) Field of Classification Search
CPC ...... G06V 40/171; G06V 40/45; G06V 40/63; G06V 40/67; G06V 40/19; G06V 40/193; G06V 40/18; G06F 21/31; G06F 21/32; G06F 21/45; G06T 7/00
See application file for complete search history.

(56) References Cited

U.S. PATENT DOCUMENTS

| | | | |
|---|---|---|---|
| 9,280,652 | B1 | 3/2016 | Bozarth |
| 10,049,272 | B2* | 8/2018 | Agrawal ................ G06V 10/17 |
| 10,515,283 | B2 | 12/2019 | Kim |
| 2005/0270386 | A1* | 12/2005 | Saitoh .................... G06V 40/45 348/239 |
| 2006/0029262 | A1* | 2/2006 | Fujimatsu ............... G06V 40/19 382/117 |
| 2006/0120707 | A1* | 6/2006 | Kusakari ................ G06V 40/19 396/18 |
| 2013/0211656 | A1 | 8/2013 | An et al. |
| 2015/0243063 | A1* | 8/2015 | Yoon ....................... G06F 21/84 345/634 |
| 2015/0254508 | A1* | 9/2015 | Kimura ................ G06V 40/197 382/117 |
| 2016/0110601 | A1 | 4/2016 | Son et al. |
| 2017/0308690 | A1 | 10/2017 | Tsukamoto et al. |
| 2017/0351929 | A1* | 12/2017 | Kim ........................... G06T 3/40 |
| 2018/0012071 | A1 | 1/2018 | Korobkin et al. |
| 2018/0018451 | A1* | 1/2018 | Spizhevoy ........... G06V 40/197 |
| 2018/0032815 | A1* | 2/2018 | Lee ...................... G06V 40/197 |
| 2020/0026920 | A1 | 1/2020 | Kimura et al. |

FOREIGN PATENT DOCUMENTS

| | | |
|---|---|---|
| JP | 2015170099 A | 9/2015 |
| KR | 20030056781 A | 7/2003 |
| KR | 1020170137476 A | 12/2017 |

OTHER PUBLICATIONS

Authentication System for Smart Homes Based on ARM7TDMI-S and IRIS-Fingerprint Recognition Technologies (Year: 2014).*
International Search Report (PCT/ISA/210) and Written Opinion (PCT/ISA/237) dated May 16, 2019 English issued by the International Searching Authority in International Application No. PCT/KR2018/009368.

* cited by examiner

| ATTRIBUTE INFORMATION OF GUIDE IMAGE (POSITION, SIZE, COLOR, ETC.) | IRIS DATA | |
|---|---|---|
| FIRST STATE | FIRST IRIS CODE |  |
| SECOND STATE | SECOND IRIS CODE |  |
| ⋮ | ⋮ | |
| $N^{TH}$ STATE | $N^{TH}$ IRIS CODE |  |

ELECTRONIC DEVICE AND OPERATING METHOD THEREFOR

TECHNICAL FIELD

Various embodiments relate to an electronic device and an operating method thereof, and more particularly, to an electronic device and an operating method thereof, in which a user is authenticated using iris recognition.

BACKGROUND ART

As various personal information or content information regarding user terminal devices used by individuals are stored, demand for security of the user terminal devices is gradually increasing. In particular, a scheme to input a password is conventionally used for security of a user terminal device, but recently, various authentication methods such as fingerprint recognition, voice recognition, iris recognition, etc., have been introduced.

In particular, for iris recognition, in a conventional user terminal device, most users attempt iris recognition by looking at a mirror-type infrared (IR) pass filter called a cold mirror and focusing their eyes to the IR pass filter. However, there are a position and a size of an iris recognizable by a user terminal device for iris recognition, but conventionally, there is no way for a user to know the position and the size of the iris recognizable by the user terminal device, making iris recognition difficult.

For iris recognition, the user terminal device may be required to perform a process of registering a user iris code. In particular, when the user iris code is registered, several iris images may be obtained to obtain a high-quality iris image, and an iris code, which is obtained from one or more iris images determined as a high-quality image by analyzing the obtained images, may be stored. Even when the several iris images are obtained and the iris code obtained from the selected iris image is stored, accurate iris recognition may be difficult to perform due to a portion hidden by an eyelid, an eyebrow, etc.

DESCRIPTION OF EMBODIMENTS

Technical Problem

Various embodiments may provide an electronic device and an operating method thereof, in which a user may perform iris recognition easily and accurately.

Solution to Problem

An electronic device according to an embodiment includes a camera capturing an eye image of a user, a display, a memory storing one or more instructions, and at least one processor configured to execute the one or more instructions stored in the memory, in which the at least one processor is configured to display a guide image on the display, change an attribute of the guide image from a first state to a second state and display the guide image, obtain first iris data from a first eye image of the user corresponding to a guide image having an attribute of the first state, obtain second iris data from a second eye image of the user corresponding to a guide image having an attribute of the second state, and perform user authentication based on the first iris data and the second iris data.

Advantageous Effects of Disclosure

The electronic device according to an embodiment may increase the accuracy of iris recognition by performing iris recognition based on a plurality of iris data pieces corresponding to a plurality of states of a guide image, allowing a user to easily use iris recognition.

BEST MODE

Figure 1:
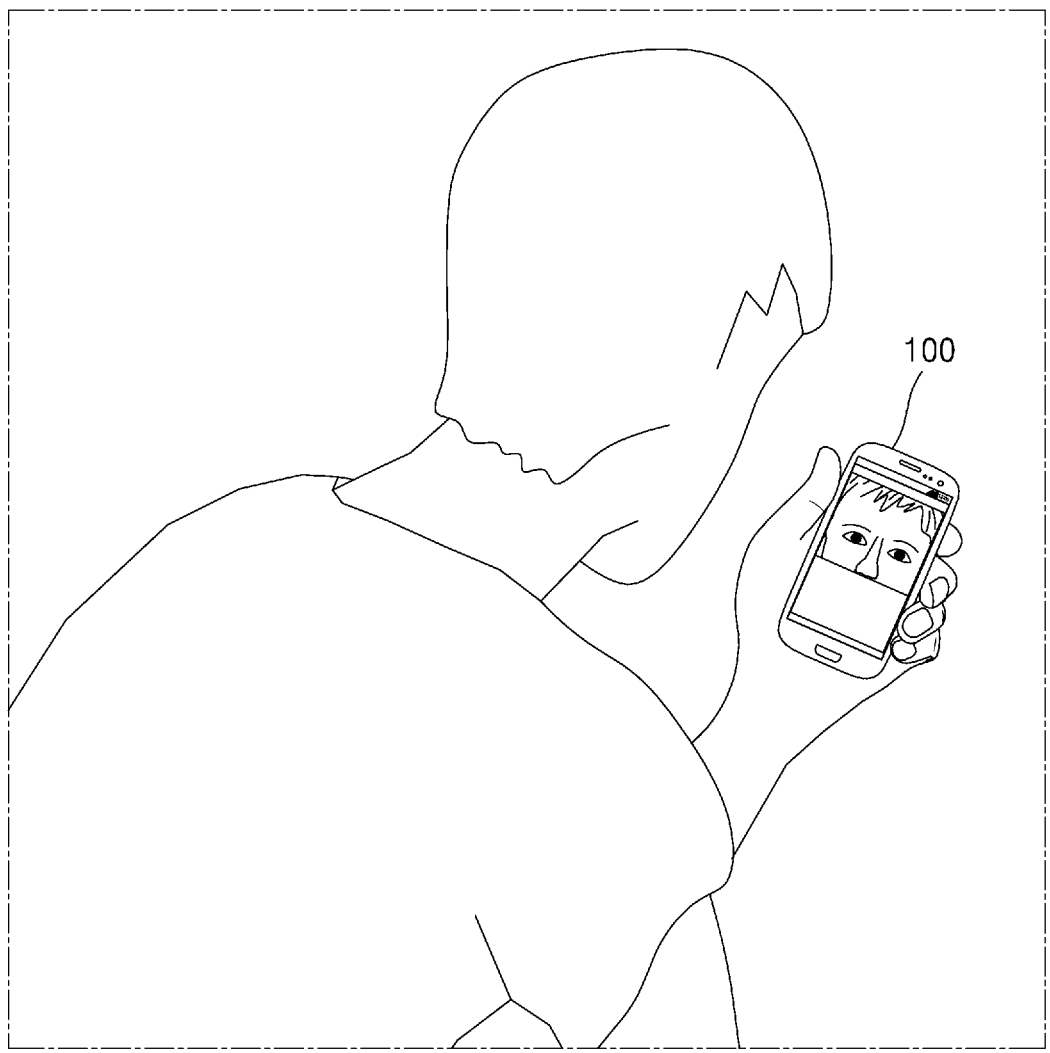
FIG. 1 illustrates an example in which a user performs iris recognition by using an electronic device, according to an embodiment.

An electronic device according to an embodiment includes a camera capturing an eye image of a user, a display, a memory storing one or more instructions, and at least one processor configured to execute the one or more instructions stored in the memory, in which the at least one processor is configured to display a guide image on the display, change an attribute of the guide image from a first state to a second state and display the guide image, obtain first iris data from a first eye image of the user corresponding to a guide image having an attribute of the first state, obtain second iris data from a second eye image of the user corresponding to a guide image having an attribute of the second state, and perform user authentication based on the first iris data and the second iris data.

The at least one processor according to an embodiment may be further configured to change at least one of a size, a color, a position, a shape, or a brightness of an object included in the guide image from the first state to the second state and display the guide image.

The at least one processor according to an embodiment may be further configured to change the position of the object included in the guide image from a first position to a second position, obtain the first iris data from the obtained first eye image when the object is displayed in the first position, and obtain the second iris data from the obtained second eye image when the object is displayed in the second position.

The at least one processor according to an embodiment may be further configured to determine whether to enter an iris registration mode or an iris authentication mode based on a user input, match the first iris data to first state information of the guide image upon entering the iris registration mode, match the second iris data to second state information of the guide image, and store the matched first iris data and first state information and the matched second iris data and second state information as registration data regarding the user, and perform user authentication by comparing each of the first iris data and the second iris data with the registration data regarding the user stored in the memory, upon entering the iris authentication mode.

The at least one processor according to an embodiment may be further configured to perform user authentication by comparing the first iris data with registration data regarding the user, which corresponds to the first state information of the guide image, and comparing the second iris data with registration data regarding the user, which corresponds to the second state information of the guide image.

The at least one processor according to an embodiment may be further configured to change the guide image into a plurality of states including the first state and the second state, display the guide image, and obtain a plurality of iris data pieces including the first iris data and the second iris data from eye images respectively corresponding to the plurality of states and determine a user authentication result based on at least one of a number and a rate of data pieces matched to the registration data among the plurality of iris data pieces, by comparing the registration data regarding the user with the plurality of obtained iris data pieces based on each of the plurality of states.

The at least one processor according to an embodiment may be further configured to extract a first iris region from the first eye image and generate a first iris code by coding a feature of an iris in the extracted first iris region and extract a second iris region from the second eye image and generate a second iris code by coding a feature of the iris in the extracted second iris region, in which the first iris data may include the first iris code and the second iris data may include the second iris code.

The at least one processor according to an embodiment may be further configured to perform user authentication based on at least one of fingerprint recognition, a code pattern, or a password, when the user authentication fails.

The guide image according to an embodiment may include a plurality of objects, and the at least one processor according to an embodiment may be further configured to change objects focused on by a gaze of the user among the plurality of objects from the first state to the second state, display the changed objects, and perform user authentication based on whether a pattern formed by the objects changed to the second state is a preset pattern.

An operating method of an electronic device according to an embodiment includes displaying a guide image having an attribute of a first state, obtaining first iris data from a first eye image of the user, which corresponds to the guide image having the attribute of the first state, changing the attribute of the guide image from the first state to a second state and displaying the guide image, obtaining second iris data from a second eye image of the user, which corresponds to the guide image having the attribute of the second state, and performing user authentication based on the first iris data and the second iris data.

A computer program product according to an embodiment includes one or more computer-readable recording media having stored therein a program for performing operations of displaying a guide image having an attribute of a first state, obtaining first iris data from a first eye image of the user, which corresponds to the guide image having the attribute of the first state, changing the attribute of the guide image from the first state to a second state and displaying the guide image, obtaining second iris data from a second eye image of the user, which corresponds to the guide image having the attribute of the second state, and performing user authentication based on the first iris data and the second iris data.

Mode of Disclosure

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

Throughout the entirety of the specification of the disclosure, if it is assumed that a certain part includes a certain component, the term 'including' means that a corresponding component may further include other components unless a specific meaning opposed to the corresponding component is written. The term used in the embodiments of the disclosure such as "unit" or "module" indicates a unit for processing at least one function or operation, and may be implemented in hardware, software, or in a combination of hardware and software.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

In an embodiment of the specification, the term "user" means a person who controls a function or an operation of a system, and may include a developer, a manager, or an installation engineer.

FIG. 1 illustrates an example in which a user performs iris recognition by using an electronic device according to an embodiment.

An electronic device 100 according to an embodiment may be implemented in various forms. For example, the electronic device 100 may be implemented with various electronic devices such as a cellular phone, a smart phone, a laptop computer, a desktop, a tablet personal computer (PC), an electronic (e)-book terminal, a digital broadcasting terminal, a personal digital assistant (PDA), a portable multimedia player (PMP), a navigator, an MP3 player, a camcorder, an Internet protocol television (IPTV), a digital TV (DTV), a wearable device, and so forth. However, the disclosure is not limited thereto.

In an embodiment of the specification, the term "user" means a person who controls a function or an operation of the electronic device, and may include a manager or an installation engineer.

Iris recognition is a biometric recognition technique which authenticates a user by using a pattern appearing on an iris existing between a pupil and a sclera in a user's eye. Iris recognition may be used to authenticate the user in unlocking, user login, mobile payment, access control, etc. An iris recognition process may roughly include a process of capturing a user's eye image and a process of recognizing an iris appearing on the eye image.

Referring to FIG. 1, the electronic device 100 according to an embodiment may include a camera to capture the user's eye image. In this case, the camera may include an IR camera, a charge-coupled device (CCD) camera, etc. The electronic device 100 may obtain iris data from the captured eye image and perform user authentication by using iris data.

The electronic device 100 according to an embodiment may operate in an iris registration mode or an iris authentication mode, based on a user input. The electronic device 100 may display a guide image for obtaining the iris data in the iris registration mode or the iris authentication mode. In this case, the electronic device 100 may change an attribute of the guide image into a plurality of states and display the guide image. For example, the electronic device 100 may move an object included in the guide image from a first position to a second position and display the guide image. The electronic device 100 may change a color of the object included in the guide image from a first color to a second color and display the guide image, and change a size of the object included in the guide image from a first size to a second size and display the guide image.

When the attribute of the guide image is changed into the plurality of states, the electronic device 100 may capture a plurality of eye images of the user and obtain iris data pieces corresponding to the plurality of states of the guide image based on the captured eye images.

The electronic device 100 may respectively match a plurality of iris data pieces to the plurality of states of the guide image (together with state information of the guide image) and store them as registration data regarding the user. The electronic device 100 may perform user authentication by comparing the plurality of obtained iris data pieces with the registration data pieces regarding the user based on the plurality of states.

Figure 2:
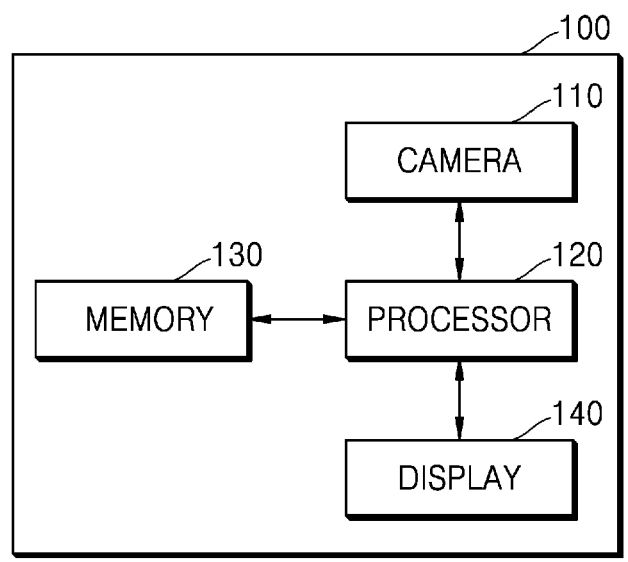
FIG. 2 is a block diagram of an electronic device according to an embodiment.

FIG. 2 is a block diagram of an electronic device according to an embodiment.

Referring to FIG. 2, the electronic device 100 according to an embodiment may include a camera 110, a processor 120, a memory 130, and a display 140.

The camera 110 according to an embodiment may obtain an image frame like a still image, a moving image, etc., through an image sensor. The camera 110 may include an IR camera, a CCD camera, etc. The image captured by the image sensor may be processed by the processor 120 or a separate image processor (not shown). The image frame processed by the camera 110 may be stored in the memory 130 or transmitted to an external source. Two or more cameras 110 may be included according to a structural aspect of the electronic device 100.

The camera 110 according to an embodiment may capture a user's eye image, and capture user's eye images corresponding to a plurality of states as the attribute of the guide image is changed into the plurality of states.

The processor 120 according to an embodiment may execute one or more programs stored in the memory 130. The processor 120 may include a single core, a dual core, a triple core, a quad core, and a core of a multiple thereof. The processor 120 may also include a plurality of processors. For example, the processor 120 may be implemented with a main processor (not shown) and a sub processor (not shown) which operates in a sleep mode.

The memory 130 according to an embodiment may store various data, programs, or applications for driving and controlling the electronic device 100.

The programs stored in the memory 130 may include one or more instructions. The programs (for example, one or more instructions) or applications stored in the memory 130 may be executed by the processor 120.

The processor 120 according to an embodiment may display the guide image on the display and change the attribute of the guide image into the plurality of states, by executing one or more instructions stored in the memory 130. For example, the processor 120 may change at least one of a size, a color, a position, a shape, or a brightness of the object included in the guide image into a plurality of states and display the guide image.

The processor 120 may receive eye images respectively corresponding to the plurality of states from the camera 110 and extract an iris region from the eye images of the user. The processor 120 may obtain user's iris data based on features of an iris shown on the extracted iris region. In this case, the processor 120 may obtain a plurality of iris data pieces corresponding to the plurality of states of the guide image.

The processor 120 may determine whether to enter the iris registration mode or the iris authentication mode, and respectively match the iris data pieces to the plurality of states of the guide image and store them as registration data regarding the user when the processor 120 determines to enter the iris registration mode. On the other hand, when the processor 120 determines to enter the iris authentication mode, the processor 120 may perform user authentication by respectively comparing the obtained iris data pieces with registration data pieces regarding the user stored in the memory 130.

The processor 120 may determine a user authentication result according to at least one of the number or a rate of data pieces matched to registration data pieces among the plurality of iris data pieces, by comparing the registration data pieces regarding the user with the obtained iris data pieces based on each of the plurality of states. For example, when the number of iris data pieces matched to registration data pieces is greater than or equal to a preset number, the processor 120 may determine that user authentication based on iris recognition is successful. When the rate of iris data pieces matched to registration data pieces is greater than or equal to a preset rate, the processor 120 may determine that user authentication based on iris recognition is successful.

When user authentication using iris data fails, the processor 120 may perform user authentication by using other authentication methods such as fingerprint recognition, a code pattern, a password, etc. The processor 120 may perform user authentication by applying an authentication method based on iris recognition and other authentication methods in a multiplex way.

The display 140 according to an embodiment may convert an image signal, a data signal, an on-screen display (OSD) signal, a control signal, or the like, processed by the processor 120, to generate a driving signal. The display 140 may be implemented with a PDP, an LCD, an OLED, a flexible display, or the like, and may also be implemented with a three-dimensional (3D) display. The display 140 may include a touch screen and thus may be used as an input device as well as an output device.

The display 140 according to an embodiment may display a guide image for obtaining iris data when the electronic device 100 enters the iris authentication mode or the iris registration mode. The guide image may include at least one object, and the attribute of the guide image may be changed into the plurality of states and the guide image may be displayed on the display 140. For example, at least one of a size, a color, a position, a shape, and a brightness of an object may be changed into a plurality of states and the guide image may be displayed.

The display 140 may display a result of user authentication based on iris recognition. For example, when the user attempts unlocking of the electronic device through iris recognition, the display 140 may display a home screen in case of a success in user authentication based on iris recognition. Alternatively, when the user attempts execution of a particular application of the electronic device through iris recognition, the display 140 may display an application execution screen in case of a success in user authentication based on iris recognition. Alternatively, when the user attempts credit card payment through iris recognition, the display 140 may display a credit card payment guide screen in case of a success in user authentication based on iris recognition. However, the disclosure is not limited to this example.

Meanwhile, the block diagram of the electronic device 100 shown in FIG. 2 is a block diagram for an embodiment. Elements of the block diagram may be integrated, added, or omitted depending on the specifications of the electronic device 100 implemented actually. That is, when necessary, two or more elements may be integrated into one element or one element may be divided into two or more elements. A function executed in each element (or module) is intended to describe embodiments of the disclosure, and a detailed operation or apparatus thereof does not limit the scope of the disclosure.

Figure 3:
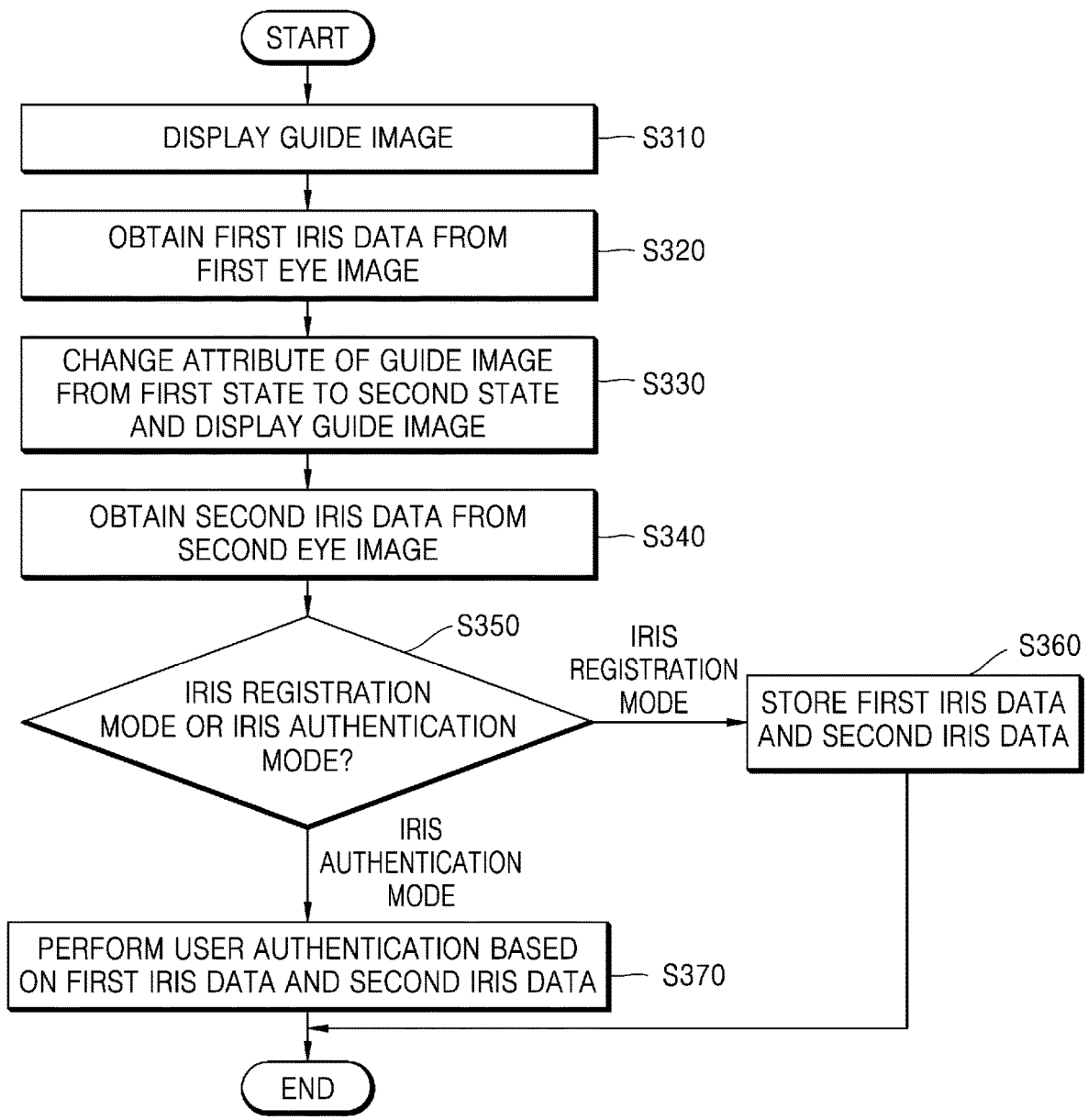
FIG. 3 is a flowchart of an operating method of an electronic device, according to an embodiment.

FIG. 3 is a flowchart of an operating method of an electronic device according to an embodiment.

Referring to FIG. 3, the electronic device 100 according to an embodiment may display a guide image in operation S310.

For example, the guide image may be a guide image for capturing an eye image of the user and may include at least one object. The guide image may have an attribute of a first state. The electronic device may display a guide message. The guide message may be a message that instructs the user to perform a particular operation in relation to the guide image. However, the disclosure is not limited to this example.

The electronic device 100 may obtain first iris data from a first eye image of the user corresponding to the guide image having the attribute of the first state, in operation S320.

For example, the electronic device 100 may capture the first eye image of the user when the guide image having the attribute of the first state is displayed. The electronic device 100 may extract an iris region from the first eye image and obtain the first iris data based on a feature of an iris shown on the iris region.

The electronic device 100 may change the attribute of the guide image from the first state to the second state and display the guide image, in operation S330.

For example, the electronic device 100 may change at least one of a size, a color, a position, a shape, and a brightness of the object included in the guide image from the first state to the second state and display the guide image.

The electronic device 100 may obtain second iris data from a second eye image of the user corresponding to the guide image having an attribute of the second state, in operation S340.

For example, the electronic device 100 may capture the second eye image of the user when the guide image having the attribute of the second state is displayed. The electronic device 100 may extract an iris region from the second eye image and obtain the second iris data based on the feature of the iris shown on the iris region.

The electronic device 100 may determine whether the iris registration mode or the iris authentication mode in operation S350, and respectively match the first iris data and the second iris data to the first state and the second state of the guide image and store them as registration data pieces regarding the user in operation S360 in case of the iris registration mode.

On the other hand, in case of the iris authentication mode, the electronic device 100 may perform user authentication by respectively comparing the obtained first iris data and second iris data with previously registered data pieces regarding the user, in operation S370.

Figure 4A:
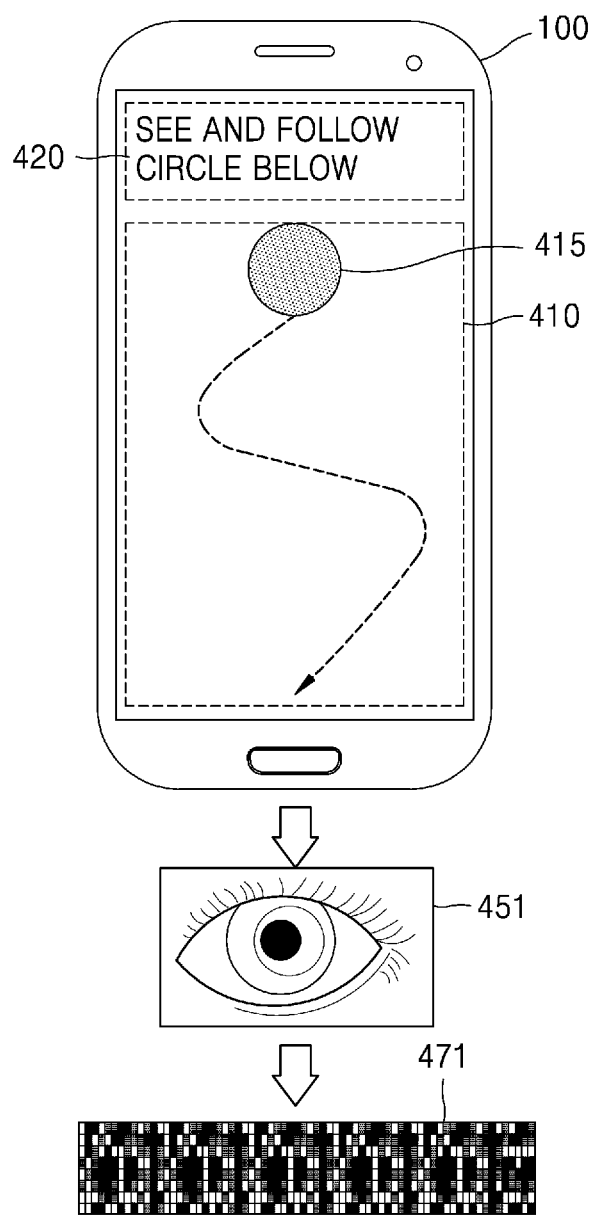
FIGS. 4A through 4C show a process in which an attribute of a guide image displayed on an electronic device is changed, according to an embodiment.
Figure 4B:
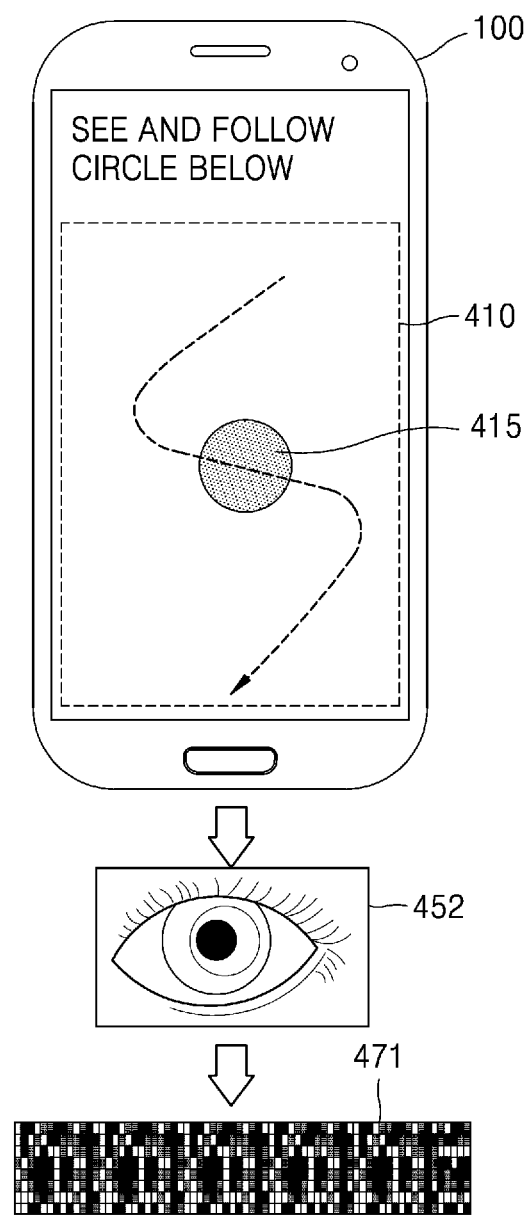
Figure 4C:
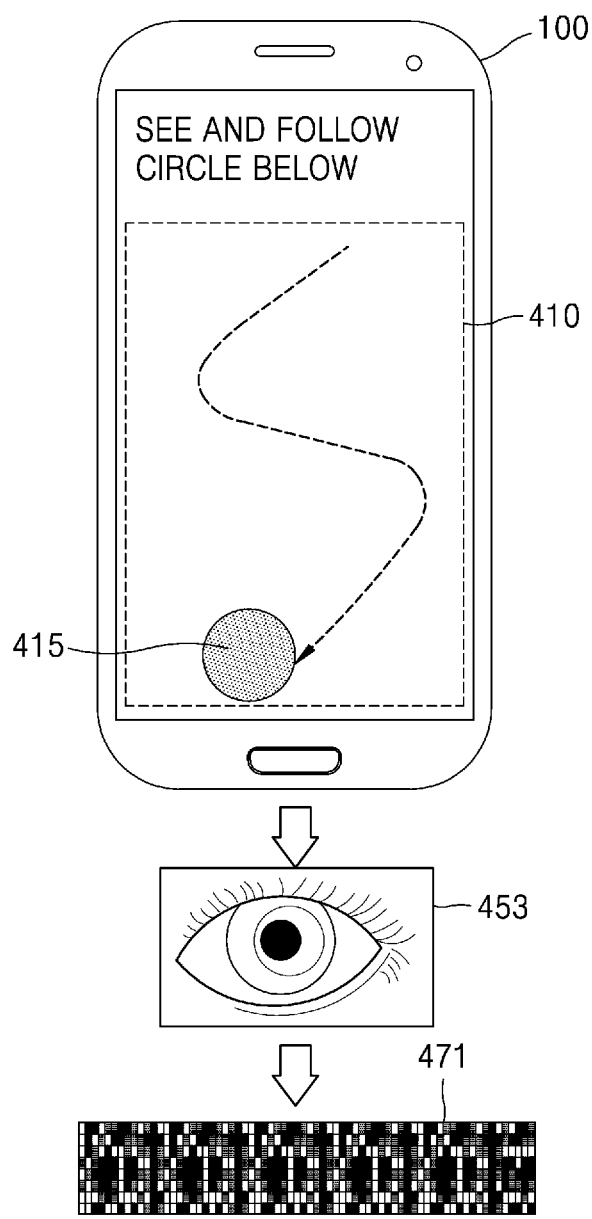

FIGS. 4A through 4C show a process in which an attribute of a guide image displayed on an electronic device is changed according to an embodiment are changed.

Referring to FIG. 4A, the electronic device 100 may display a guide image 410 on the display. The guide image 410 may be an image displayed on the display to obtain users iris data. For example, the electronic device 100 may display the guide image when registration of iris data of the user is requested or user authentication based on iris recognition is requested.

The guide image 410 may include an object 415 which has a circular shape in FIGS. 4A through 4C, but the object 415 may also have various shapes such as a triangular shape, a rectangular shape, a pentagonal shape, a star shape, etc., without being limited thereto. While the guide image is shown as including one object in FIGS. 4A through 4C, the guide image may also include a plurality of objects, without being limited thereto.

The electronic device 100 may display a guide message 420 on the display. The guide message 420 may be a message that instructs the user to perform a particular operation in relation to the guide image 410. For example, as shown in FIG. 4A, the guide message 420 may be a message that instructs the user to see and follow the circular object 415 included in the guide image 410.

Referring to FIGS. 4A through 4C, the attribute of the guide image 410 may be changed. For example, referring to FIG. 4A, the object 415 included in the guide image 410 may be located in the first position. The object 415 included in the guide image 410 may move along a moving path indicated by an arrow. The moving path indicated by the arrow may be displayed on the guide image 410. Referring to FIG. 4B, the object 415 included in the guide image 410 may be located in the second position by moving along the moving path. Referring to FIG. 4C, the object 415 included in the guide image 410 may be located in a third position by moving along the moving path.

The electronic device 100 according to an embodiment may capture a users eye image (a first eye image) 451 in a state where the object 415 is located in the first position. The electronic device 100 may extract an iris region from the user's eye image 451 and code the feature of the iris in the extracted iris region, thereby generating first iris data (a first iris code) 471. The electronic device 100 may capture a user's eye image (a second image) 452 in a state where the object 415 is located in the second position, and capture a user's eye image (a third eye image) 453 in a state where the object 415 is located in the third position.

The electronic device 100 may generate second iris data (a second iris code) 472 and third iris data (a third iris code) 473, based on the second eye image 452 and the third eye image 453. A method, performed by the electronic device 100, of generating iris data from a users eye image will be described in detail with reference to FIG. 5.

Figure 5:
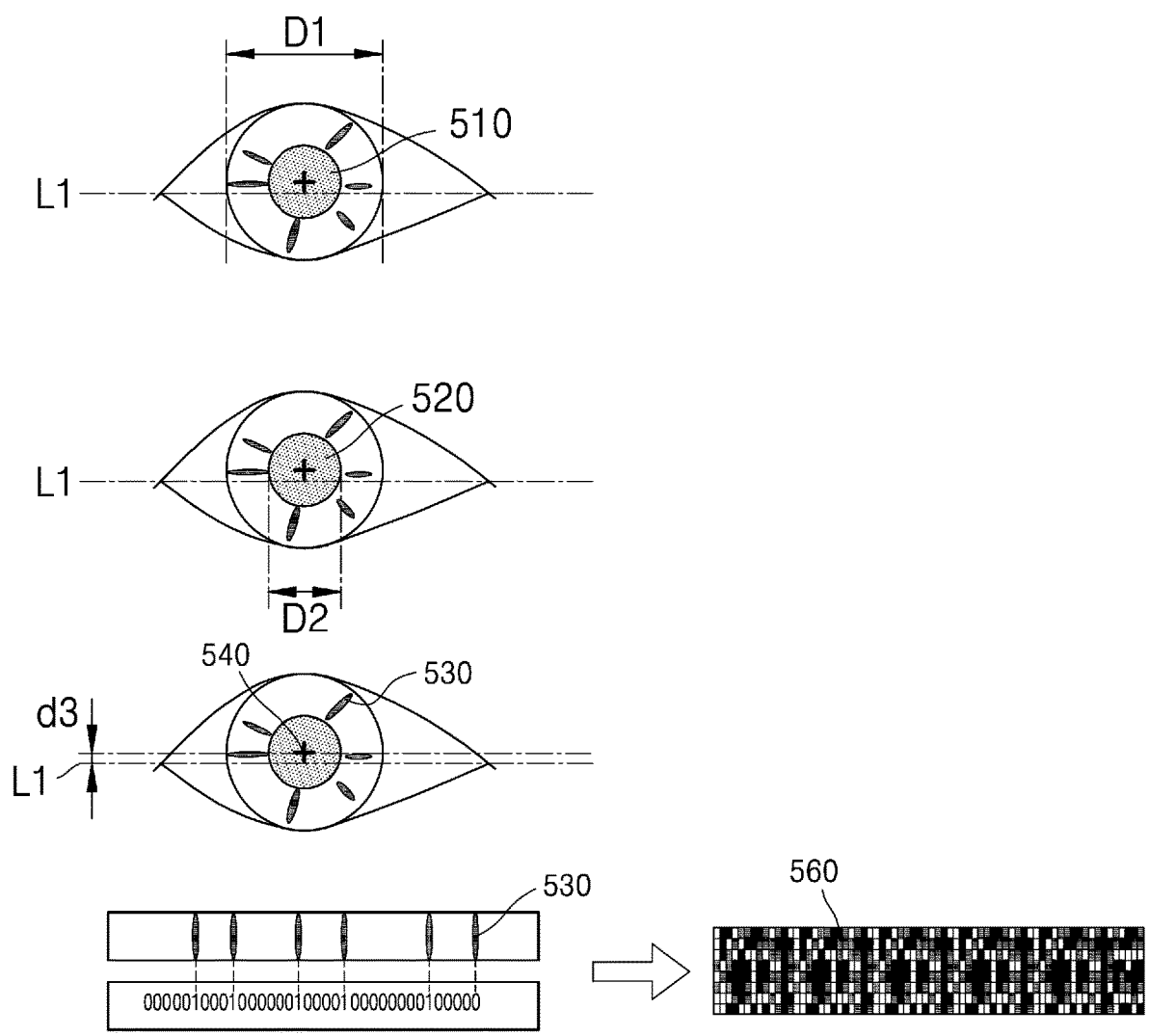
FIG. 5 illustrates a process in which an electronic device according to an embodiment generates iris data from an eye image of a user.

FIG. 5 illustrates a process in which an electronic device according to an embodiment generates iris data from an eye image of a user.

Referring to FIG. 5, the electronic device 100 may capture a users eye image. The eye image according to an embodiment, which is an image including a user's eye region, may include a color image, a grey image, or an IR image. Alternatively, the electronic device 100 may capture a facial image on which a user's facial region appears or a partial facial image on which a partial facial region appears, and obtain the eye image from the facial image. However, the disclosure is not limited to this example.

The electronic device 100 may extract the iris region from the captured user's eye image and extract a line (a reference line) L1 connecting opposite ends of the eyes of the user. The electronic device 100 may calculate a diameter D1 of an iris 510 based on the reference line L1. The electronic device 100 may calculate a diameter D2 of a pupil 520 based on the reference line L1 and calculate a distance d3 between the reference line L1 and a center 540 of the pupil 520. The electronic device 100 may perform coding by performing polar coordinate transform on (or normalizing) coordinates of a point at which a muscle 530 of the iris intersects a boundary of the pupil. Thus, the electronic device 100 may obtain an iris code 560.

The electronic device 100 according to an embodiment may obtain, as iris data, a rate of the diameter D2 of the pupil to the diameter D1 of the iris, the distance d3 between the reference line L1 and the center 540 of the pupil, and data (an iris code) regarding the point at which the muscle of the iris intersects the boundary of the pupil. The electronic device 100 may also encode and store the obtained iris data.

The method of generating the iris data, described with reference to FIG. 5, is merely an example, and the electronic device 100 may generate the iris data in various ways, without being limited thereto.

Figure 6:
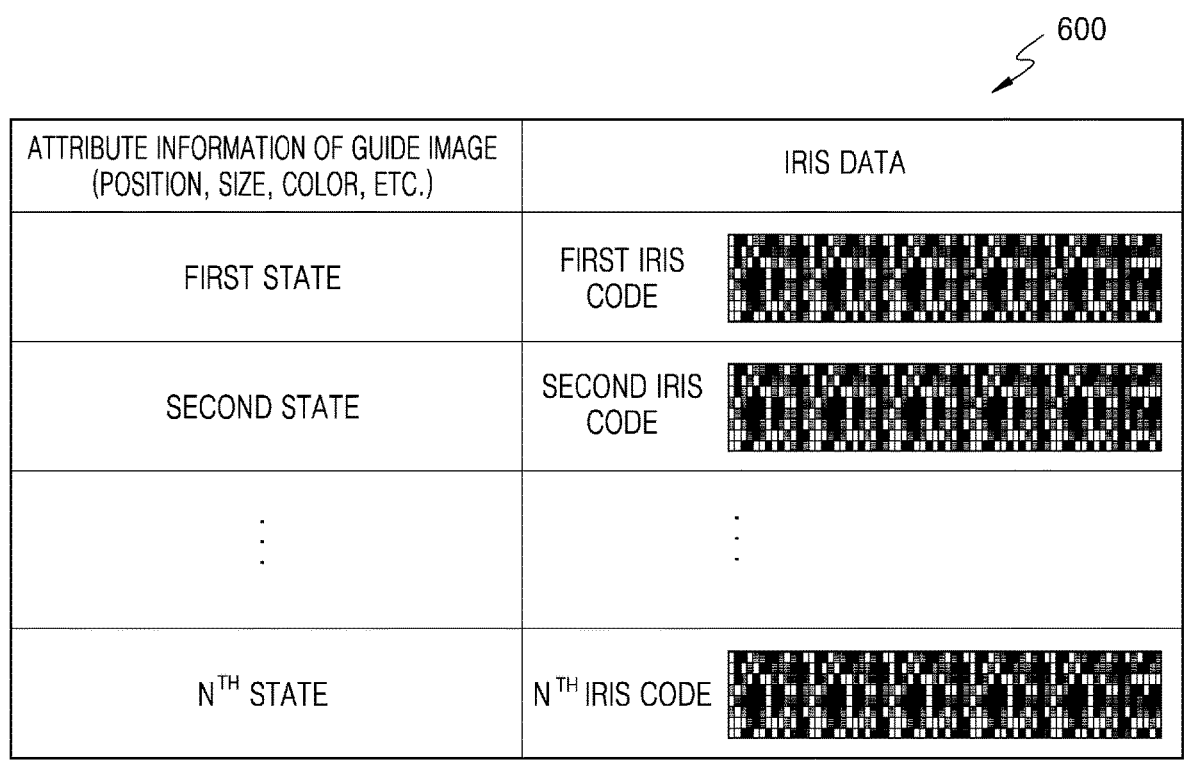
FIG. 6 illustrates an example in which iris data regarding a user is stored, according to an embodiment.
Figure 6:
Figure 6:
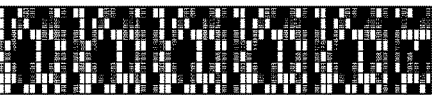

FIG. 6 illustrates an example in which iris data regarding a user is stored, according to an embodiment.

An attribute of the guide image displayed on the electronic device 100 according to an embodiment may be changed into a plurality of states. For example, a position, a size, a color, and a brightness of the object included in the guide image, etc., may be changed and the guide image may be displayed. When the attribute of the guide image is changed, the electronic device 100 may respectively capture user's eye images from the plurality of states (first through $n^{th}$ states), and obtain a plurality of iris data pieces (e.g., first through $n^{th}$ iris codes) based on the user's eye images.

Referring to FIG. 6, when there is a registration request for user's iris data, the electronic device 100 according to an embodiment may store the plurality of obtained iris data pieces (e.g., the first through $n^{th}$ iris codes), together with attribute information of the guide image, as registration data 600.

For example, the electronic device 100 may map information (guide image information having a first state) of the guide image in which the object is located in the first position to the first iris data and store them, map information (guide image information having a second state) of the guide image in which the object is located in the second position to the second iris data and store them, and map information (guide image information having an $n^{th}$ state) of the guide image in which the object is located in an $n^{th}$ position to $n^{th}$ iris data and store them.

When user authentication based on iris recognition is requested, the electronic device 100 may perform user authentication by comparing the plurality of obtained iris data pieces with users registration data based on attribute information of the guide image.

For example, the electronic device 100 may compare the first iris data 471 obtained in FIG. 4A with user's registration data (the first iris code) corresponding to the guide image in which the object is located in the first position, compare second iris data 472 obtained in FIG. 4B with user's registration data (the second iris code) corresponding to the guide image in which the object is located in the second position, and compare third iris data 473 obtained in FIG. 4C with users registration data (the third iris code) corresponding to the guide image in which the object is located in the third position.

Figure 7:
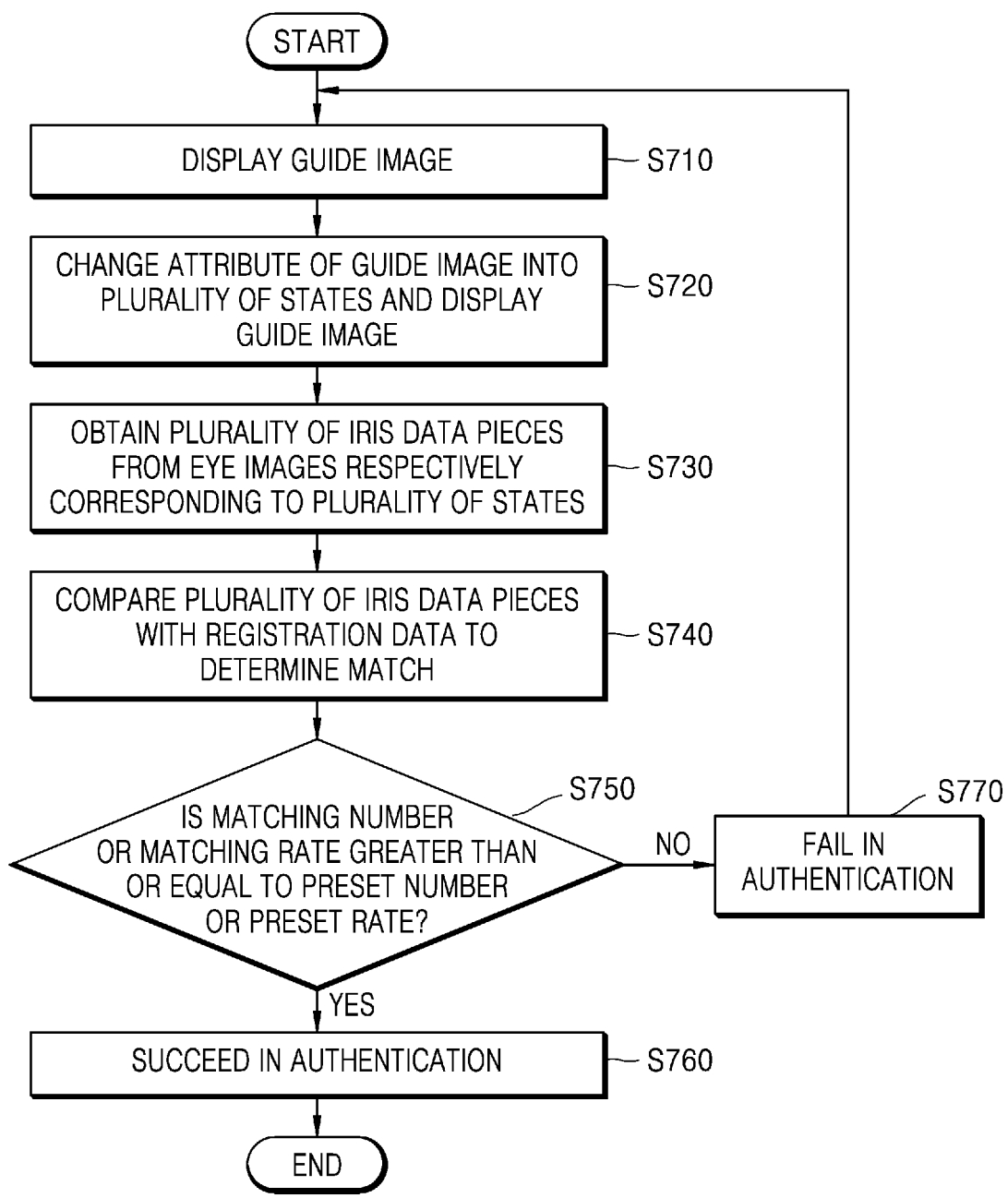
FIG. 7 is a flowchart of an operating method of an electronic device according to an embodiment.

FIG. 7 is a flowchart of an operating method of an electronic device according to an embodiment.

Referring to FIG. 7, the electronic device 100 may display a guide image in operation S710.

For example, the guide image may be a guide image for capturing an eye image of the user and may include at least one object.

The electronic device 100 may change an attribute of the guide image into a plurality of states and display the guide image, in operation S720.

For example, the electronic device 100 may change at least one of a size, a color, a position, a shape, and a brightness of the object included in the guide image into a plurality of states and display the guide image.

The electronic device 100 may obtain a plurality of iris data pieces from eye images respectively corresponding to the plurality of states, in operation S730.

For example, the electronic device 100 may capture eye images respectively corresponding to the plurality of states and extract an iris region from the eye images of the user. The electronic device 100 may obtain user's iris data based on features of an iris shown on the extracted iris region. In this case, the electronic device 100 may obtain a plurality of iris data pieces respectively corresponding to the plurality of states of the guide image.

The electronic device 100 may determine a user authentication result according to at least one of the number and a rate of data pieces matched to registration data pieces among the plurality of iris data pieces in operation S750, by comparing the registration data pieces regarding the user with the obtained iris data pieces in operation S740. For example, when the number of iris data pieces matched to registration data pieces is greater than or equal to a preset number, the electronic device 100 may determine that user authentication based on iris recognition is successful. When the rate of iris data pieces matched to registration data pieces is greater than or equal to a preset rate, the electronic device 100 may determine that user authentication based on iris recognition is successful.

FIGS. 8A through 8D illustrate a method, performed by an electronic device according to an embodiment, of performing user authentication through iris recognition.

Figure 8A:
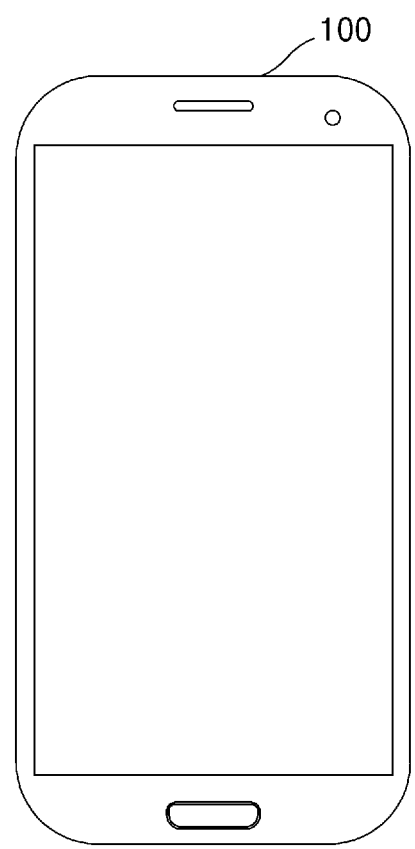
FIGS. 8A through 8D illustrate a method, performed by an electronic device according to an embodiment, of performing user authentication through iris recognition.

Referring to FIG. 8A, the electronic device 100 may receive an unlocking input. For example, the unlocking input may include, but not limited to, an input to press a particular button (e.g., a power button, a home button, etc.) included in the electronic device 100, an input to touch or drag a screen of the electronic device 100, a voice input, etc.

Figure 8B:
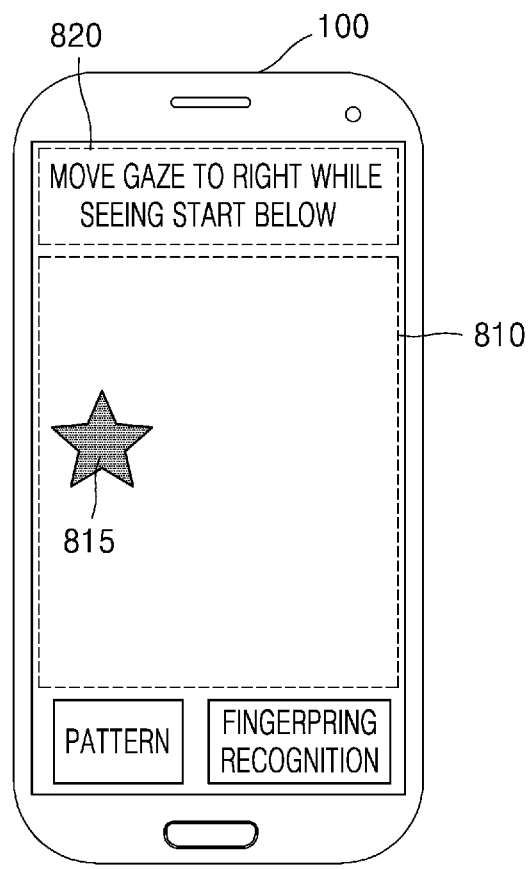

Referring to FIG. 8B, when the electronic device 100 receives the unlocking input, the electronic device 100 may display a guide image 810 for iris recognition. In this case, the guide image 810 may include a star-shape object 815 which may be located in the first position (a start point). However, the disclosure is not limited thereto. The electronic device 100 may display a guide message 820 that instructs the user to perform a particular operation in relation to the guide image 810. The guide message 820 may be a message that instructs the user to move a gaze of the user to the right while seeing the star-shape object 815.

Figure 8C:
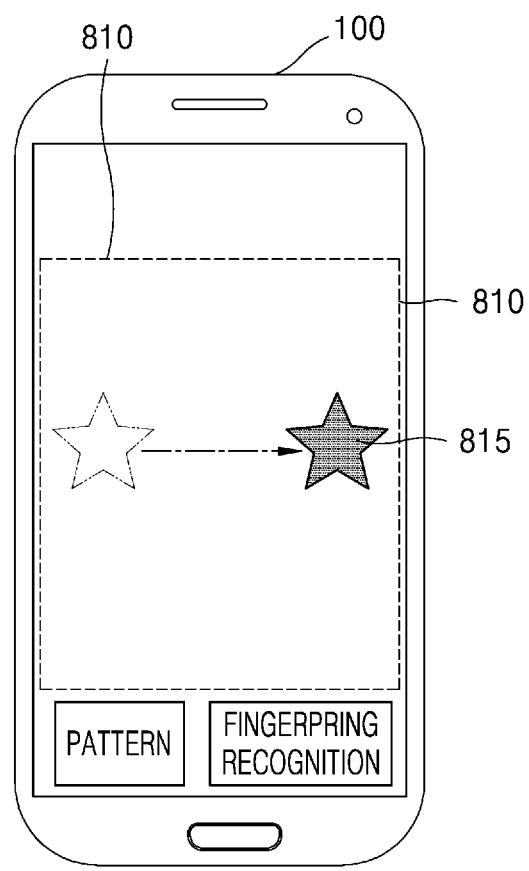

The user may move the gaze to the right while focusing the star-shape object 815 included in the guide image 810 along the guide image 810 and the guide message 820. In this case, the electronic device 100 may track the user's eyes to move the star-shape object 815 to the right corresponding to movement of the gaze of the user as shown in FIG. 8C. When the movement of the object 815 ends, the object 815 may be located in the second position (an end point).

The electronic device 100 may capture a plurality of eye images of the user when the star-shape object 815 moves from the first position to the second position. For example, when the star-shape object 815 is located in each of five points (first through fifth points) located in different positions while moving from the first position to the second position, the electronic device 100 may obtain first through fifth eye images by capturing the user's eye image. The first through fifth points may be preset points. They may also be points determined according to state information of the guide image corresponding to each of registered iris data pieces of the user.

The electronic device 100 may extract the iris region from the first eye image corresponding to the first point and obtain the first iris data according to feature information of the extracted iris region. In the same manner, the electronic device 100 may obtain second through fifth iris data from the second through fifth eye images respectively corresponding to the second through fifth points.

The electronic device 100 may compare the first through fifth iris data with users registration data. The users registered iris data (registration data) may be data stored together with state information of the guide image. The electronic device 100 may compare the first through fifth iris data with registration data based on the state information of the guide image corresponding to the registration data and the state information of the guide image corresponding to the first through fifth iris data.

Figure 8D:
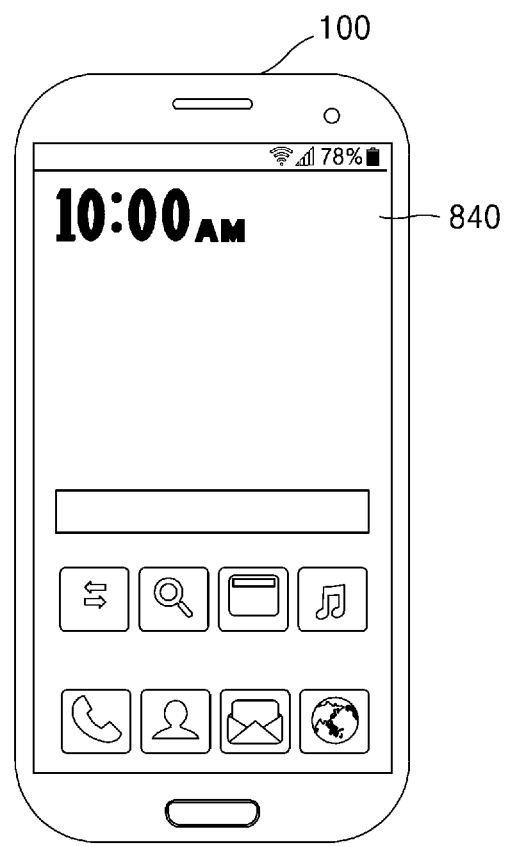

As a result of comparison, when the number of iris data matched to the registration data among the first through fifth iris data is greater than or equal to a preset number, the electronic device 100 may unlock the electronic device 100. Alternatively, when a rate of the iris data matched to the registration data among the first through fifth iris data is greater than or equal to a preset rate, the electronic device 100 may unlock the electronic device 100. For example, the electronic device 100 may display a home screen 840 as shown in FIG. 8D.

On the other hand, when the number of iris data matched to the registration data among the first through fifth iris data is less than the preset number or when the rate of the iris data matched to the registration data among the first through first iris data is less than the preset rate, the electronic device 100 may newly start iris recognition by displaying the guide image 810 shown in FIG. 8B without unlocking the electronic device 100. Alternatively, by using other authentication methods (e.g., a pattern input method, a fingerprint recognition method, etc.), the electronic device 100 may perform user authentication.

FIGS. 9A through 9D illustrate a method, performed by an electronic device according to an embodiment, of performing user authentication through iris recognition.

Figure 9A:
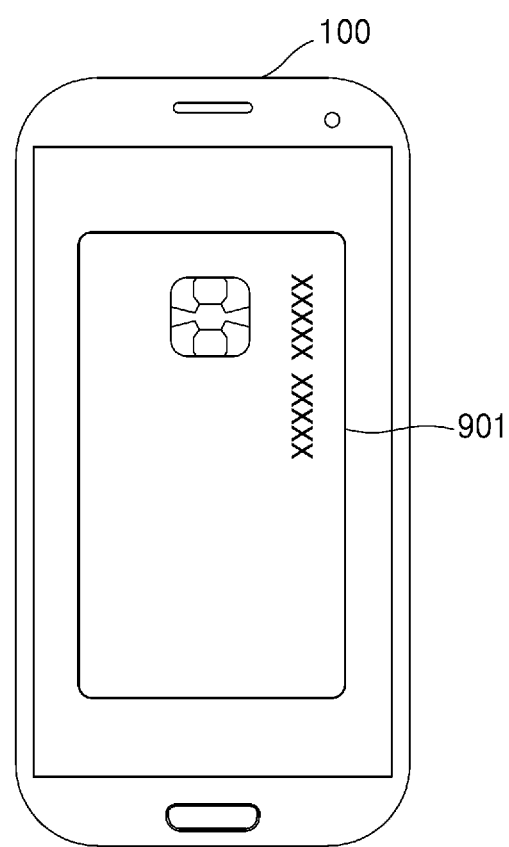
FIGS. 9A through 9D illustrate a method, performed by an electronic device, according to an embodiment, of performing user authentication through iris recognition.

Referring to FIG. 9A, the electronic device 100 may provide a payment function and receive an input to select a registered card 901. The electronic device 100 may register a card to be used for payment in the electronic device 100 based on a user input and perform payment by using the registered card.

Figure 9B:
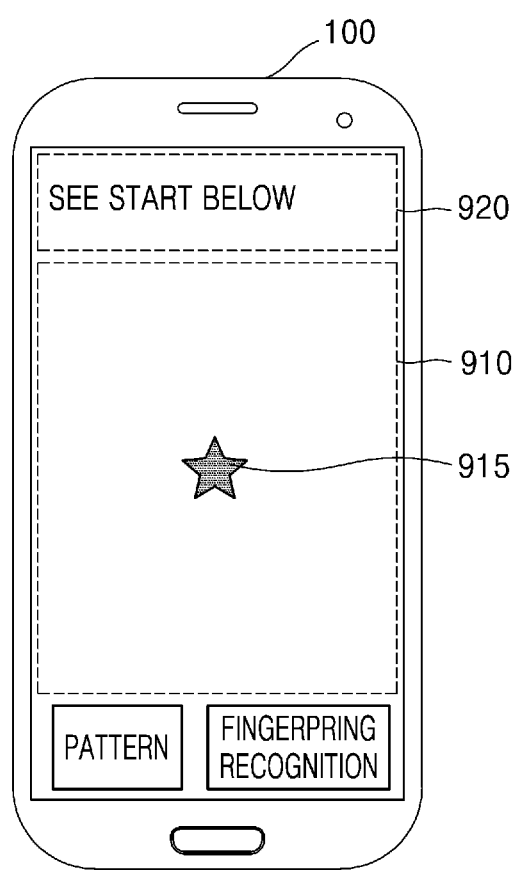

Referring to FIG. 9B, when the card to be used for payment is selected, the electronic device 100 may display a guide image 910 for iris recognition. In this case, the guide image 910 may include a star-shape object 915 which may have a first size. However, the disclosure is not limited thereto. The electronic device 100 may display a guide message 920 that instructs the user to perform a particular operation in relation to the guide image 910.

The guide message 920 may be a message which instructs the user to see a star-shape object.

The user may focus the star-shape object 915 included in the guide image 910 along the guide image 910 and the guide message 920. The electronic device 100 may change the size of the star-shape object 915 for a preset time and display the star-shape object 915. For example, for the preset time, the size of the star-shape object 915 may gradually increase from a first size to a second size. In this case, the color or brightness of the object 915 may also be changed and the object 915 may be displayed.

Figure 9C:
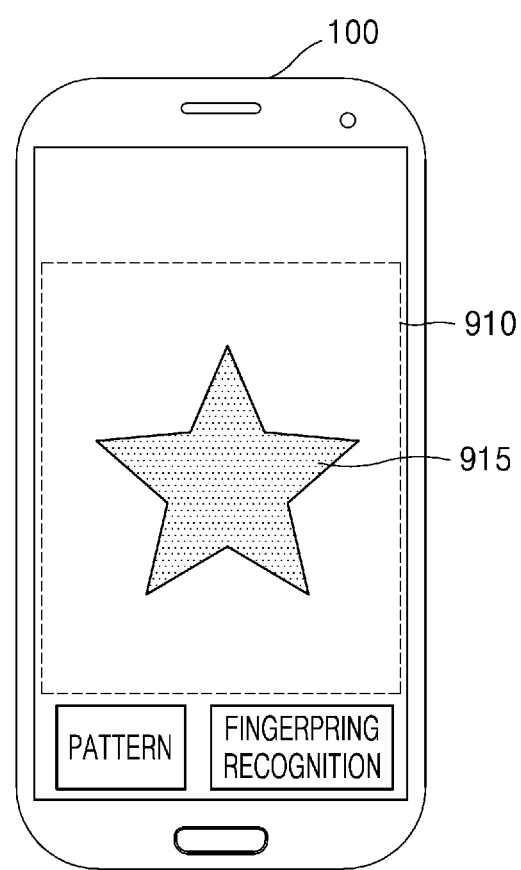

When the change of the size of the star-shape object 915 ends, the size of the star-shape object 915 may increase to the second size as shown in FIG. 9C.

The electronic device 100 may capture a plurality of eye images of the user when the star-shape object 915 is changed. For example, when the star-shape object 915 has five different sizes (a size of the object has first through fifth values) as the object 915 increases in size from the first size to the second size, the electronic device 100 may obtain the first through fifth eye images by capturing the user's eye image. In this case, the first through fifth values may be preset values. They may also be points determined according to state information of the guide image corresponding to each of registered iris data pieces of the user.

The electronic device 100 may extract the iris region from the first eye image corresponding to the first value and obtain the first iris data according to feature information of the extracted iris region. In the same manner, the electronic device 100 may obtain the second through fifth iris data from the second through fifth eye images respectively corresponding to the second through fifth values.

The electronic device 100 may compare the first through fifth iris data with user's registration data. The user's registered iris data (registration data) may be data stored together with state information of the guide image. The electronic device 100 may compare the first through fifth iris data with registration data based on the state information of the guide image corresponding to the registration data and the state information of the guide image corresponding to the first through fifth iris data.

Figure 9D:
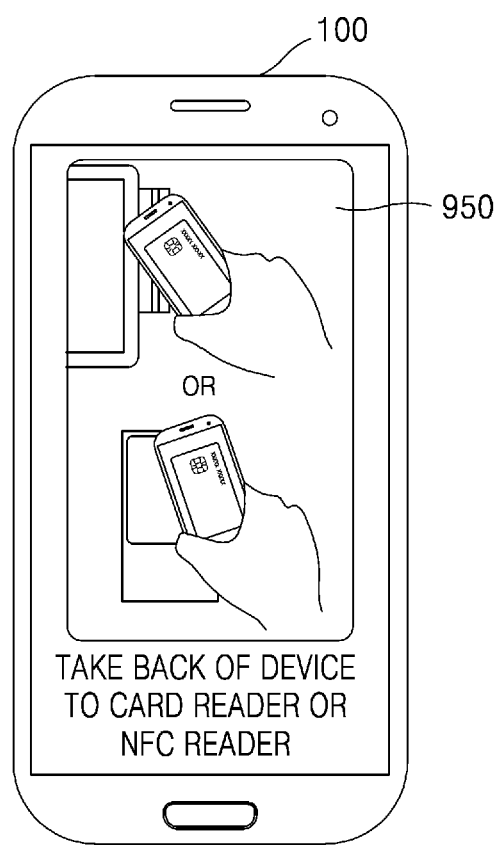

As a result of comparison, when the number of iris data matched to the registration data among the first through fifth iris data is greater than or equal to a preset number, the electronic device 100 may activate the selected card. Alternatively, when the rate of the iris data matched to the registration data among the first through fifth iris data is greater than or equal to a preset rate, the electronic device 100 may activate the selected card. For example, when the card is activated by successful user authentication, the electronic device 100 may display a card payment guide image 950 as shown in FIG. 9D.

On the other hand, when the number of iris data matched to the registration data among the first through fifth iris data is less than the preset number or when the rate of the iris data matched to the registration data among the first through first iris data is less than the preset rate, the electronic device 100 may newly start iris recognition by displaying the guide image 920 shown in FIG. 9B without activating the card. Alternatively, by using other authentication methods (e.g., a pattern input method, a fingerprint recognition method, etc.), the electronic device 100 may perform user authentication.

FIGS. 10A through 10D illustrate a method, performed by an electronic device, according to an embodiment, of performing user authentication through iris recognition.

Figure 10A:
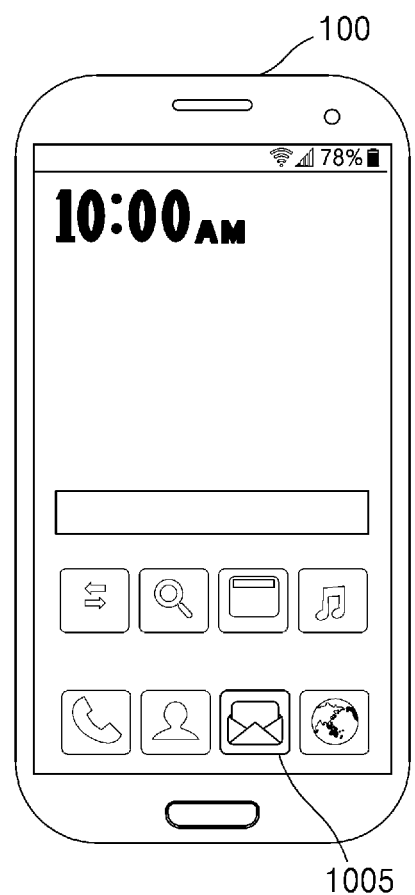
FIGS. 10A through 10D illustrate a method, performed by an electronic device, according to an embodiment, of performing user authentication through iris recognition.

Referring to FIG. 10A, the electronic device 100 may receive an input to select a message application 1005 on the home screen. In this case, the message application may be in a locked state.

Figure 10B:
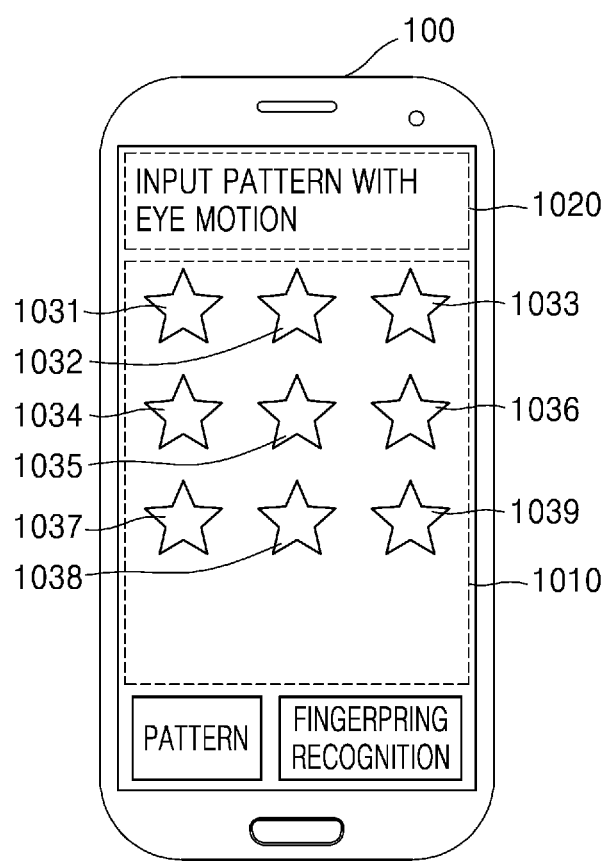
Figure 10C:
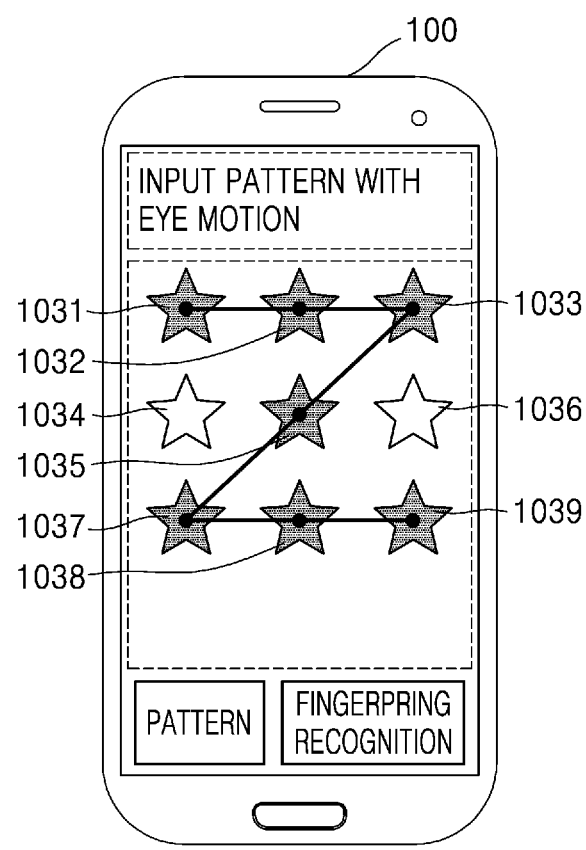

Referring to FIG. 10B, the electronic device 100 may display a guide image 1010 for iris recognition. In this case, the guide image 1010 may include a plurality of objects which may have a first color. For example, the plurality of objects may include first through ninth objects 1031, 1032, 1033, 1034, 1035, 1036, 1037, 1038, and 1039. However, the disclosure is not limited thereto. The electronic device 100 may display a guide message 1020 that instructs the user to perform a particular operation in relation to the guide image.

The guide message 1020 may be a message which instructs the user to input a pattern with eye motion of the user.

The user may focus, among first through ninth objects 1031, 1032, 1033, 1034, 1035, 1036, 1037, 1038, and 1039 included in the guide image, the first object 1031, the second object 1032, the third object 1033, the fifth object 1035, the seventh object 1037, the eighth object 1038, and the ninth object 1039 constituting a preset pattern (e.g., a 'Z' pattern) in that order according to the guide image 1010 and the guide message 1020. In this case, the electronic device 100 may change a color of an object on which the user's gaze is given as shown in FIG. 100 by tracking the users eye. For example, as the user sequentially focuses the first object 1031, the second object 1032, the third object 1033, the fifth object 1035, the seventh object 1037, the eighth object 1038, and the ninth object 1039 in that order, the colors of the first object 1031, the second object 1032, the third object 1033, the fifth object 1035, the seventh object 1037, the eighth object 1038, and the ninth object 1039 may be sequentially changed in that order from a first color to a second color.

The electronic device 100 may also capture the user's eye image while the first object 1031, the second object 1032, the third object 1033, the fifth object 1035, the seventh object 1037, the eighth object 1038, and the ninth object 1039 are sequentially focused in that order. For example, the electronic device 100 may capture a first eye image when the user focuses the first object 1031, and capture a second eye image when the user focuses the second object 1032. In the same manner, the electronic device 100 may capture the third eye image, the fifth eye image, the seventh eye image, the eighth eye image, and the ninth eye image.

The electronic device 100 may extract the iris region from the first eye image and obtain the first iris data according to feature information of the extracted iris region. In the same manner, the electronic device 100 may obtain a plurality of iris data pieces from the other eye images.

The electronic device 100 may compare the plurality of obtained iris data pieces (e.g., seven iris data pieces) with user's registration data. In this case, the user's registered iris data may be data stored together with state information of the guide image.

The electronic device 100 may compare the seven iris data pieces with the registration data based on the state information of the guide image corresponding to the registration data and the state information of the guide image.

Figure 10D:
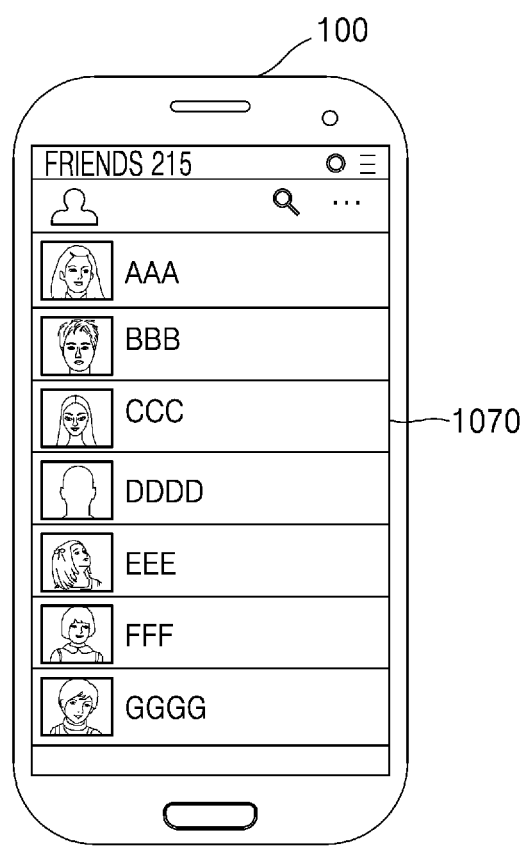

As a result of comparison, when the number of iris data matched to the registration data among the seven iris data pieces is greater than or equal to a preset number, the electronic device 100 may activate the message application. Alternatively, when the rate of the iris data matched to the registration data among the seven iris data pieces is greater than or equal to a preset rate, the electronic device 100 may activate the message application. For example, when the message application is executed, the electronic device 100 may display a message application execution screen 1070 as shown in FIG. 10D.

On the other hand, when the number of iris data matched to the registration data among the seven iris data pieces is less than the preset number or when the rate of the iris data matched to the registration data among the seven iris data pieces is less than the preset rate, the electronic device 100 may newly start iris recognition by displaying the guide image 1020 shown in FIG. 10B without executing the message application. Alternatively, by using other authentication methods (e.g., a pattern input method, a fingerprint recognition method, etc.), the electronic device 100 may perform user authentication.

Figure 11:
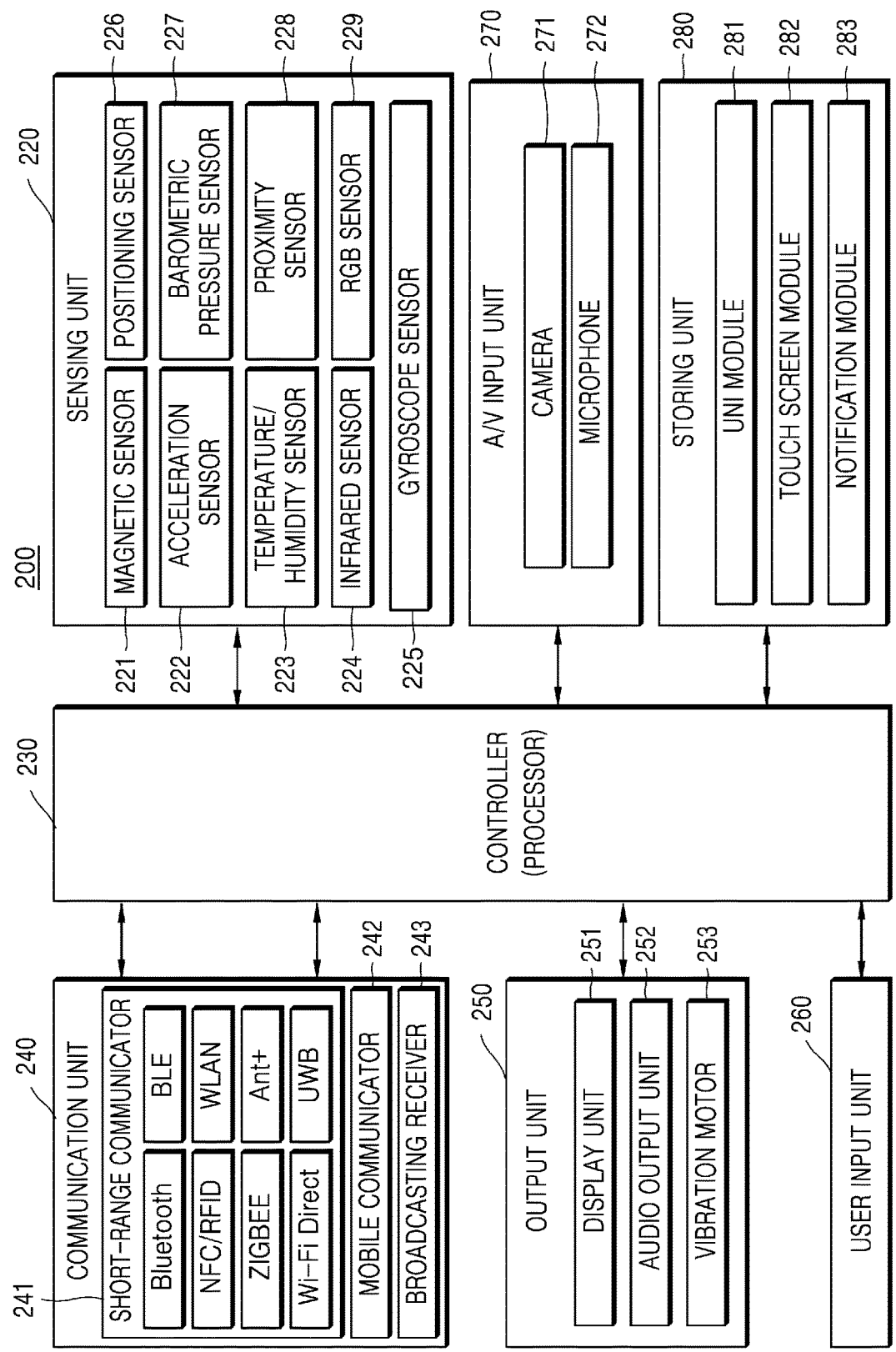
FIG. 11 is a block diagram of an electronic device according to another embodiment.

FIG. 11 is a block diagram of an electronic device according to another embodiment. An electronic device 200 shown in FIG. 11 may be an embodiment of the electronic device 100 shown in FIG. 1.

Referring to FIG. 11, the electronic device 200 according to an embodiment of the disclosure may include a controller 230, a sensing unit 220, a communication unit 240, an output unit 250, a user input unit 260, an audio/video (NV) input unit 270, and a storing unit 280.

The camera 371 of FIG. 11 may correspond to the camera 110 of FIG. 2, the controller 230 of FIG. 11 may correspond to the processor 120 of FIG. 2, the storing unit 280 of FIG. 11 may correspond to the memory 130 of FIG. 2, and a display unit 251 of FIG. 11 may correspond to the display 140 of FIG. 2. The same description as made with reference to FIG. 2 will not be provided with reference to FIG. 11.

The communication unit 240 may include one or more components for performing communication between the electronic device 200 and the external device (e.g., a server, etc.). For example, the communication unit 240 may include a short-range wireless communicator 241, a mobile communicator 242, and a broadcasting receiver 243.

The short-range wireless communicator 241 may include, but not limited to, a Bluetooth communication unit, a near field communication (NFC) unit, a wireless local area network (WLAN) (WiFi) communication unit, a ZigBee communication unit, an infrared Data Association (IrDA) communication unit, a WiFi Direct (WFD) communication unit, an ultra wideband (UWB) communication unit, and an Ant+ communication unit.

The mobile communicator 242 transmits and receives a radio signal to and from at least one of a base station, an external terminal, and a server over a mobile communication network. Herein, the radio signal may include various forms of data corresponding to transmission/reception of a voice call signal, a video communication call signal, or a text/multimedia message.

The broadcasting receiver 243 receives a broadcast signal and/or broadcasting-related information from an external source through a broadcasting channel. The broadcasting channel may include a satellite channel and a terrestrial channel. According to implementation examples, the electronic device 200 may not include the broadcasting reception unit 243.

The output unit 250 may be intended to output an audio signal, a video signal, or a vibration signal, and may include the display unit 251, an audio output unit 252, a vibration motor 253, and so forth. The display unit 251 has been already described with reference to FIG. 2, and thus will not be described at this time.

The audio output unit 252 may output audio data received from the communicator 240 or stored in the storing unit 280. The audio output unit 252 outputs an audio signal related to a function (e.g., a call signal receiving sound, a message receiving sound, an alarm sound, etc.) performed in the electronic device 200. The audio output unit 252 may include a speaker, a buzzer, or the like.

The vibration motor 253 outputs a vibration signal. For example, the vibration motor 253 may output a vibration signal corresponding to output of audio data or video data (e.g., a call signal receiving sound, a message receiving sound, etc.). The vibration motor 253 may output a vibration signal if a touch is input to a touch screen.

The controller 230 controls an overall operation of the electronic device 200. For example, the controller 230 may control in overall the communication unit 240, the output unit 250, the user input unit 260, the sensing unit 220, or the A/V input unit 270, by executing programs stored in the storing unit 280.

The user input unit 260 is a means through which a user inputs data for controlling the electronic device 200. For example, the user input unit 260 may include, but not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

The sensing unit 220 may include a sensor for sensing a state of the electronic device 16200 or an ambient state of the electronic device 200 as well as a sensor for sensing user's biometric information. The sensing unit 220 may deliver information sensed by the sensor to the controller 230.

The sensing unit 220 may include, but not limited to, at least one of a magnetic sensor 221, an acceleration sensor 222, a temperature/humidity sensor 223, an infrared sensor 224, a gyroscope sensor 225, a positioning sensor 226 (e.g., a global positioning system (GPS)), a barometric pressure sensor 227, a proximity sensor 228, and a red/green/blue (RGB) sensor 229 (or an illuminance sensor). A function of each sensor may be intuitively construed from a name of the sensor by those of ordinary skill in the art, and thus will not be described in detail.

The A/V input unit 270 may input an audio signal or a video signal, and may include a camera 271, the microphone 272, and so forth. The camera 271 obtains an image frame such as a still image or a moving image in a video communication mode or a photographing mode through an image sensor. The image captured by the image sensor is processed by the controller 230 or a separate image processor (not shown).

An image frame processed by the camera 271 is stored in the storing unit 280 or transmitted to an external source through the communication unit 240. Two or more cameras 271 may be included according to a structural aspect of the electronic device 200.

The microphone 272 may receive an external audio signal and processes the received signal into electric voice data. For example, the microphone 272 may receive an audio signal from an external device or a speaker. The microphone 272 may use various noise cancellation algorithms for canceling noise generated during reception of the external audio signal.

The storing unit 280 may store a program for processing and control of the controller 16230, and store input/output data (e.g., an application, content, time-zone information of an external device, an address book, etc.).

The storing unit 280 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth. The electronic device 200 operates a web storage or a cloud server that performs a storage function of the storing unit 280 on the Internet.

The programs stored in the storing unit 280 may be classified into a plurality of modules depending on a function thereof, e.g., a user interface (UI) module 281, a touch screen module 282, a notification module 283, and so forth.

The UI module 281 provides a specialized UI or graphic UI (GUI) interworking with the electronic device 200 for each application. The touch screen module 282 may sense a touch gesture of a user on a touch screen and delivers information about the touch gesture to the control unit 230.

The touch screen module 282 according to some embodiments may recognize and analyze a touch code. The touch screen module 282 may be configured with separate hardware including a controller.

The notification module 283 may generate a signal for notifying of an occurrence of an event of the display device 200. Examples of the event occurring in the electronic device 200 may include call signal reception, message reception, key signal input, schedule notification, and so forth. The notification module 283 outputs a notification signal in the form of a video signal through the display unit 251, in the form of an audio signal through the audio output unit 252, and/or in the form of a vibration signal through the vibration motor 253.

Meanwhile, the block diagram of the electronic device 200 shown in FIG. 11 is a block diagram for an embodiment. Elements of the block diagram may be integrated, added, or omitted depending on the specifications of the electronic device 200 implemented actually. That is, when necessary, two or more elements may be integrated into one element or one element may be divided into two or more elements. A function executed in each element (or module) is intended to describe embodiments of the disclosure, and a detailed operation or apparatus thereof does not limit the scope of the disclosure.

The operation method of the electronic device according to an embodiment of the disclosure may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program instructions include a machine language code created by a complier and a high-level language code executable by a computer using an interpreter.

The electronic device or the operation method of the electronic device according to the embodiments of the disclosure may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of an S/W program electronically distributed through a manufacturer or the electronic device or an electronic market (e.g., Google Play Store or App Store). For the electronic distribution, at least a portion of the S/W program may be stored in a storage medium or temporarily generated. In this case, the storage medium may be a storage medium of a server in the manufacturer or the electronic market or a relay server.

The computer program product may include a storage medium of a server or a storage medium of a client device, in a system including the server and the client device. Alternatively, when there is a third device (e.g., a smart phone) communicating with the server or the client device, the computer program product may include a storage medium of the third device. Alternatively, the computer program product may include an S/W program itself, which is transmitted from the server to the client device or the third device or transmitted from the third device to client device.

In this case, one of the server, the client device, and the third device may execute the computer program product to perform the method according to the embodiments of the disclosure. Alternatively, two or more of the server, the client device, and the third device may execute the computer program product to execute the method according to the embodiments of the disclosure in a distributed manner.

For example, a server (e.g., a cloud server or AI server, etc.) may execute a computer program product stored in the server to control the client device communicating with the server to perform the method according to the embodiments of the disclosure.

While the disclosure has been shown and described with reference to certain example embodiments thereof, the scope of the disclosure is not limited to the description and also includes various modifications and improvements made by those of ordinary skill in the art using the concept of the disclosure defined in the appended claims.

The invention claimed is:

1. An electronic device comprising:
a camera capturing an eye image of a user;
a display;
a memory storing one or more instructions; and
at least one processor configured to execute the one or more instructions stored in the memory,
wherein the at least one processor is configured to:
display a guide image on the display, change an attribute of the guide image from a first state to a second state and display the guide image, obtain first iris data from a first eye image of the user corresponding to a guide image having an attribute of the first state, obtain second iris data from a second eye image of the user corresponding to a guide image having an attribute of the second state, and perform user authentication based on the first iris data and the second iris data.

2. The electronic device of claim 1, wherein the at least one processor is further configured to change at least one of a size, a color, a position, a shape, or a brightness of an object included in the guide image from the first state to the second state and display the guide image.

3. The electronic device of claim 2, wherein the at least one processor is further configured to change the position of the object included in the guide image from a first position to a second position, obtain the first iris data from the obtained first eye image when the object is displayed in the first position, and obtain the second iris data from the obtained second eye image when the object is displayed in the second position.

4. The electronic device of claim 1, wherein the at least one processor is further configured to:
determine whether to enter an iris registration mode or an iris authentication mode based on a user input;
match the first iris data to first state information of the guide image upon entering the iris registration mode, match the second iris data to second state information of the guide image, and store the matched first iris data and first state information and the matched second iris data and second state information as registration data regarding the user; and
perform user authentication by comparing each of the first iris data and the second iris data with the registration data regarding the user stored in the memory, upon entering the iris authentication mode.

5. The electronic device of claim 4, wherein the at least one processor is further configured to perform user authentication by comparing the first iris data with registration data regarding the user, which corresponds to the first state information of the guide image, and comparing the second iris data with registration data regarding the user, which corresponds to the second state information of the guide image.

6. The electronic device of claim 1, wherein the at least one processor is further configured to:
change the guide image into a plurality of states comprising the first state and the second state, display the guide image, and obtain a plurality of iris data pieces comprising the first iris data and the second iris data from eye images respectively corresponding to the plurality of states; and
determine a user authentication result based on at least one of a number and a rate of data pieces matched to the registration data among the plurality of iris data pieces, by comparing the registration data regarding the user with the plurality of obtained iris data pieces based on each of the plurality of states.

7. The electronic device of claim 1, wherein the at least one processor is further configured to:
  extract a first iris region from the first eye image and generate a first iris code by coding a feature of an iris in the extracted first iris region; and
  extract a second iris region from the second eye image and generate a second iris code by coding a feature of the iris in the extracted second iris region,
  wherein the first iris data comprises the first iris code and the second iris data comprises the second iris code.

8. The electronic device of claim 1, wherein the at least one processor is further configured to perform user authentication based on at least one of fingerprint recognition, a code pattern, or a password, when the user authentication fails.

9. The electronic device of claim 1, wherein the guide image comprises a plurality of objects, and
  the at least one processor is further configured to change objects focused on by a gaze of the user among the plurality of objects from the first state to the second state, display the changed objects, and perform user authentication based on whether a pattern formed by the objects changed to the second state is a preset pattern.

10. An operating method of an electronic device, the operating method comprising:
  displaying a guide image having an attribute of a first state;
  obtaining first iris data from a first eye image of the user, which corresponds to the guide image having the attribute of the first state;
  changing the attribute of the guide image from the first state to a second state and displaying the guide image;
  obtaining second iris data from a second eye image of the user, which corresponds to the guide image having the attribute of the second state; and
  performing user authentication based on the first iris data and the second iris data.

11. The operating method of claim 10, wherein the changing of the attribute of the guide image from the first state to the second state and the displaying of the guide image comprise changing at least one of a size, a color, a position, a shape, or a brightness of an object included in the guide image from the first state to the second state and displaying the guide image.

12. The operating method of claim 11, wherein the changing of the attribute of the guide image from the first state to the second state and the displaying of the guide image comprise changing the position of the object included in the guide image from a first position to a second position and displaying the object, and
  the obtaining of the first iris data comprises obtaining the first iris data from the obtained first eye image when the object is displayed in the first position, and
  the obtaining of the second iris data comprises obtaining the second iris data from the obtained second eye image when the object is displayed in the second position.

13. The operating method of claim 10, further comprising:
  determining whether to enter an iris registration mode or an iris authentication mode based on a user input; and
  matching the first iris data to first state information of the guide image upon entering the iris registration mode, matching the second iris data to second state information of the guide image, and storing the matched first iris data and first state information and the matched second iris data and second state information as registration data regarding the user, and
  the performing of user authentication comprises performing user authentication by comparing each of the first iris data and the second iris data with the registration data regarding the user stored in the memory, upon entering the iris authentication mode.

14. The operating method of claim 13, wherein the performing of user authentication comprises performing user authentication by comparing the first iris data with registration data regarding the user, which corresponds to the first state information of the guide image, and comparing the second iris data with registration data regarding the user, which corresponds to the second state information of the guide image.

15. The operating method of claim 10, further comprising:
  changing an attribute of the guide image into a plurality of states and displaying the guide image; and
  obtaining a plurality of iris data pieces from eye images respectively corresponding to the plurality of states, and
  the performing of user authentication comprises determining a user authentication result based on at least one of a number or a rate of data pieces matched to the registration data among the plurality of iris data pieces, by comparing the registration data regarding the user with the plurality of obtained iris data pieces based on each of the plurality of states.

16. The operating method of claim 10, wherein the obtaining of the first iris data comprises extracting a first iris region from the first eye image and generating a first iris code by coding a feature of an iris in the extracted first iris region, and
  the obtaining of the second iris data comprises extracting a second iris region from the second eye image and generating a second iris code by coding a feature of the iris in the extracted second iris region.

17. The operating method of claim 10, further comprising performing user authentication based on at least one of fingerprint recognition, a code pattern, or a password, when the user authentication fails.

18. The operating method of claim 10, wherein the guide image comprises a plurality of objects, and
  the performing of user authentication comprises changing objects focused on by a gaze of the user among the plurality of objects from the first state to the second state, displaying the changed objects, and performing user authentication based on whether a pattern formed by the objects changed to the second state is a preset pattern.

19. A computer program product comprising one or more non-transitory computer-readable recording media having stored therein a program for performing operations of:
  displaying a guide image having an attribute of a first state;
  obtaining first iris data from a first eye image of the user, which corresponds to the guide image having the attribute of the first state;
  changing the attribute of the guide image from the first state to a second state and displaying the guide image;
  obtaining second iris data from a second eye image of the user, which corresponds to the guide image having the attribute of the second state; and
  performing user authentication based on the first iris data and the second iris data.

20. The computer program product of claim 19, wherein the changing of the attribute of the guide image from the first state to the second state and the displaying of the guide image comprise changing the position of the object included in the guide image from a first position to a second position and displaying the object, and
   the obtaining of the first iris data comprises obtaining the first iris data from the obtained first eye image when the object is displayed in the first position, and
   the obtaining of the second iris data comprises obtaining the second iris data from the obtained second eye image when the object is displayed in the second position.

* * * * *